United States Patent
Bigolin

(10) Patent No.: US 7,219,395 B2
(45) Date of Patent: May 22, 2007

(54) HANDLEBAR GRIP, IN PARTICULAR FOR A BICYCLE

(75) Inventor: Riccardo Bigolin, San Zenone degli Ezzelini (IT)

(73) Assignee: Selle Royal S.p.A., Pozzoleone (Vincenza) (IT)

( * ) Notice: Subject to any disclaimer, the term of this patent is extended or adjusted under 35 U.S.C. 154(b) by 0 days.

(21) Appl. No.: 10/363,416

(22) PCT Filed: Apr. 5, 2002

(86) PCT No.: PCT/IB02/01101

§ 371 (c)(1),
(2), (4) Date: Mar. 3, 2003

(87) PCT Pub. No.: WO02/081294
PCT Pub. Date: Oct. 17, 2002

(65) Prior Publication Data

US 2003/0177609 A1    Sep. 25, 2003

(30) Foreign Application Priority Data

Apr. 6, 2001   (IT) .......................... VI2001A0079

(51) Int. Cl.
*B62K 21/26* (2006.01)
*B62K 21/12* (2006.01)

(52) U.S. Cl. .............................. 16/421; 16/422; 16/436

(58) Field of Classification Search .................. 16/421, 16/422, 426, 431, 429, 435, 436, 440, 110.1, 16/111.1, DIG. 12, DIG. 18, DIG. 19; 280/821; 74/551.9, 502.2; 473/300, 303, 549; 482/44, 482/49
See application file for complete search history.

(56) References Cited

U.S. PATENT DOCUMENTS

| | | | | | |
|---|---|---|---|---|---|
| 579,774 | A | * | 3/1897 | Rugg ......................... | 74/551.9 |
| 4,381,579 | A | * | 5/1983 | Rumpp ........................ | 16/436 |
| 4,416,166 | A | * | 11/1983 | Jannard et al. ............ | 74/551.9 |
| 4,535,649 | A | * | 8/1985 | Stahel ........................ | 74/551.9 |
| 5,003,997 | A | * | 4/1991 | Stewart et al. ................ | 132/73 |
| 5,730,662 | A | * | 3/1998 | Rens ......................... | 473/300 |
| 5,934,154 | A | * | 8/1999 | Noel .......................... | 74/551.9 |
| 6,035,742 | A | * | 3/2000 | Hollingsworth et al. ... | 74/551.9 |
| 6,112,618 | A | | 9/2000 | Yates | |
| 6,363,813 | B1 | * | 4/2002 | Vian ......................... | 74/551.9 |
| 6,561,058 | B1 | * | 5/2003 | Steinke ...................... | 74/551.9 |
| 6,615,687 | B2 | * | 9/2003 | Bendetti et al. ........... | 74/551.9 |

(Continued)

FOREIGN PATENT DOCUMENTS

DE         3148656 A1 *  6/1983

(Continued)

*Primary Examiner*—Robert J. Sandy
*Assistant Examiner*—Andre L. Jackson
(74) *Attorney, Agent, or Firm*—Alston & Bird LLP

(57) ABSTRACT

Handlebar grip for a bicycle or similar vehicle, formed by a main rigid body of tubular shape supporting, fixed thereon, a covering of moderately soft material, in particular in gel form. Two terminal elements are provided at the ends of the grip, each of the elements being provided with an annular protection rim intended to line a corresponding end edge of the covering, and with an elastically deformable tubular lug to be inserted between an end section of the handlebar and the main body, compressed between the handlebar and the main body so as to ensure gripping engagement as a result of friction thereon.

13 Claims, 2 Drawing Sheets

U.S. PATENT DOCUMENTS 6,615,688 B2 * 9/2003 Wessel ................ 74/551.9
2003/0167873 A1 * 9/2003 Yu ..................... 74/551.1

FOREIGN PATENT DOCUMENTS

| JP | 09-266960 A | 4/1992 |
| JP | 08-198169 | * 8/1996 |
| JP | 10-138982 A | 5/1998 |
| WO | 99/37473 A1 | 7/1999 |

* cited by examiner

HANDLEBAR GRIP, IN PARTICULAR FOR A BICYCLE

FIELD OF APPLICATION

The present invention relates to a grip intended to be traditionally mounted on the handlebars of a bicycle or on other vehicles so as to ensure a secure gripping action by cyclists or other users.

BACKGROUND ART

As part of the continuous development of improvements made to all the constructional details which compose bicycles, the grip which forms the subject of the present invention arises in response to the need to simplify the manufacturing process and from requirements to improve their qualitative and operational characteristics.

The grips on the market nowadays generally differ from each other in terms of their particular anatomical shape, the materials used or the manufacturing process by means of which they are made.

As is known, said grips are traditionally formed by a substantially cylindrical body which is made of plastic material, is internally hollow and can be inserted onto the ends of handlebars generally formed by suitably shaped metal tubes.

Advantageously, grooves of varying shape may be formed on the outer surface of the grips, said grooves being intended to assist ventilation of the hand gripping thereon, preventing possible problems arising from excessive sweating.

The grip may also have a particular anatomical form able to allow an optimum grip by the cyclist and/or assist the natural blood circulation of the hand and/or produce a massaging effect on the palm.

In particular, said form may have a convexity arranged in the zone where the cyclist's hand rests, said convexity being capable of absorbing the vibrations transmitted from the ground. The shape and position of the abovementioned convexity are designed according to the position assumed by the cyclist on the bicycle, said position also depending, as is known, to a significant degree on the specific type of bicycle used. In fact, for example, general purpose bicycles, known as ATB tracking, presuppose that the cyclist assumes a sitting position able to determine a bust angle on the bicycle of about 60°, while mountain bikes (MTB racing) and city touring bicycles require a bust angle of about 30° and 90°, respectively.

In more recently manufactured grips, the anatomical form with anti-sweat grooves and the abovementioned convexity is obtained using relatively soft materials which have high shock-absorbency characteristics, such as rubber, soft plastic, polyurethane or, more advantageously, material in gel form.

Moreover, the same grips made of, or solely lined with, relatively soft materials are more easily subject to wear. The greatest deterioration occurs, as is known, at the ends and especially at the outermost end, which is easily able to come into contact with or scrape against other objects and which is often used to support the bicycle.

With the aim of limiting this drawback, grips provided with a protective plug mounted on the outer end of the handlebar have been recently developed as, for example, described and illustrated in U.S. Pat. No. 6,112,618. According to the embodiment shown in FIG. 2 of this patent, the gel grip is provided with an internal cavity intended to receive the handlebar tube. Alternatively, in the embodiment shown in FIG. 3, the gel part is designed in the form of a sleeve fixed externally on a main, rigid or semi-rigid, tubular-shaped body. In both cases, the plug is provided with a central projection intended to be inserted by force into the cavity of the handlebar so as to retain the grip in a fixed position.

In practice, however, both the embodiments shown in this patent do not allow a stable and easy engagement of the grip on the handlebar. It should be noted in particular that in the case where the grip is formed completely by material in gel form, it can be functionally difficult to fit the grip on the handlebar, given the significant friction which the gel material exerts on the metallic surface of the handlebar and which must be overcome during said insertion operation.

On the other hand, in the case where a rigid main body covered with a gel sleeve is envisaged, it is necessary to envisage a perfect calibration of the internal diameter of the main body and/or the external diameter of the handlebar so that the correct interference between said non-deformable elements results in a stable engagement of the grip on the handlebar. It is nonetheless clear that, in practice, it is not always possible to guarantee such machining precision and it is therefore convenient to assign the task of retaining the grip on the handlebar to the abovementioned central projection. In this case, however, the retaining force may be unsatisfactory given the small surface area available for retaining the grip. Moreover, projections of greater length would once again involve difficulties when inserting the grip on the handlebar.

Generally speaking, it can also be said that the grips manufactured to date are capable of exerting a stable fixing action only on handlebars with predetermined dimensions and adapt poorly to being mounted, with even minimum tolerances, on handlebars which diverge, even slightly, from said dimensions.

However, given that the handlebars available on the market, especially if derived from various manufacturing sources, may differ appreciably in terms of the size of their diameter, the result is that the grips are not generally capable of guaranteeing a stable fixing action on all handlebars.

It should also be remembered that the handlebars nowadays envisage a single protective element arranged on the outer end of the grip, while the inner end of said grip, which is intended to be inserted on the handlebar, is not protected in any way, with the result that said inner end is easily susceptible to rapid deterioration, especially where it is made of material which is soft and/or in gel form.

DISCLOSURE OF THE INVENTION

A primary object of the present invention is therefore that of eliminating the drawbacks of the abovementioned known art by providing a grip for bicycles which guarantees a stable fixing action on handlebars of differing cross-sections within a sufficiently wide tolerance range.

A further object of the present invention is that of designing a grip which is particularly resistant in terms of wear phenomena and at the same time sufficiently soft to dampen the vibrations transmitted from the ground.

Another particular object of the present invention is that of designing a grip which is constructionally simple and operationally completely reliable.

A further object of the present invention is that of providing a grip which can be easily arranged on the handlebars of any bicycle.

These objects, together with others, are all achieved by the handlebar grip, in particular for a bicycle or the like, which forms the subject of the present invention and comprises a main body of substantially tubular shape with a longitudinal axis, defining a cylindrical cavity able to receive the end section of a handlebar, and a covering of soft material which is externally fixed to the main body. According to the invention, the grip is characterized in that it comprises at least one terminal element provided with an annular protection rim intended to line a corresponding end of the grip, and a tubular lug which extends coaxially inside the main body between the end section of the handlebar and the main body itself, the tubular lug being intended to perform a gripping engagement on the end section of the handlebar and on the main body through the effect of frictional forces resulting from an elastic deformation thereof due to compression between the handlebar and the main body.

Thanks to the present invention, grips of extremely high quality can be mounted easily and with a good guarantee as to gripping on handlebars of various dimensions within reasonable limits.

BRIEF DESCRIPTION OF THE DRAWINGS

Further features and advantages of the invention will be more clearly understood from the detailed description of a preferred, but not exclusive embodiment of a handlebar grip according to the invention, illustrated by way of a non-limiting example with the assistance of the accompanying drawings, in which.

DETAILED DESCRIPTION OF A PREFERRED EXAMPLE OF EMBODIMENT

Figure 1:
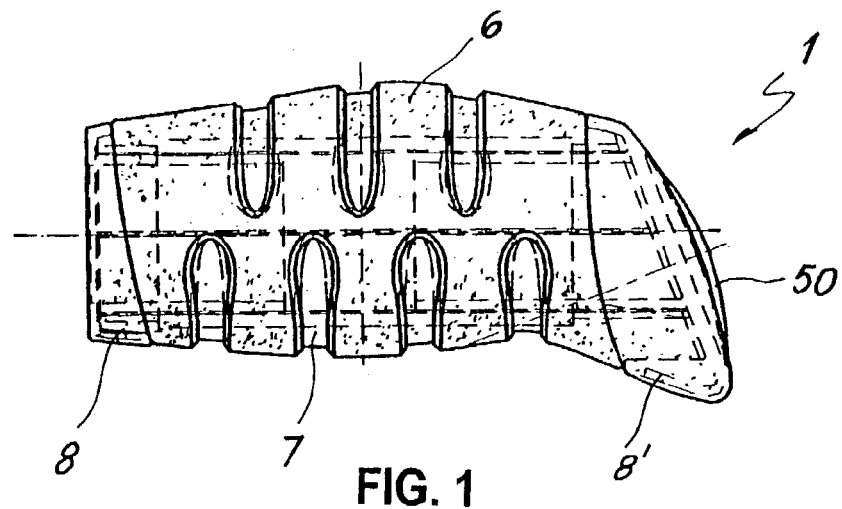
FIG. 1 shows an overall side view of an embodiment of the grip which forms the subject of the present invention.
Figure 2:
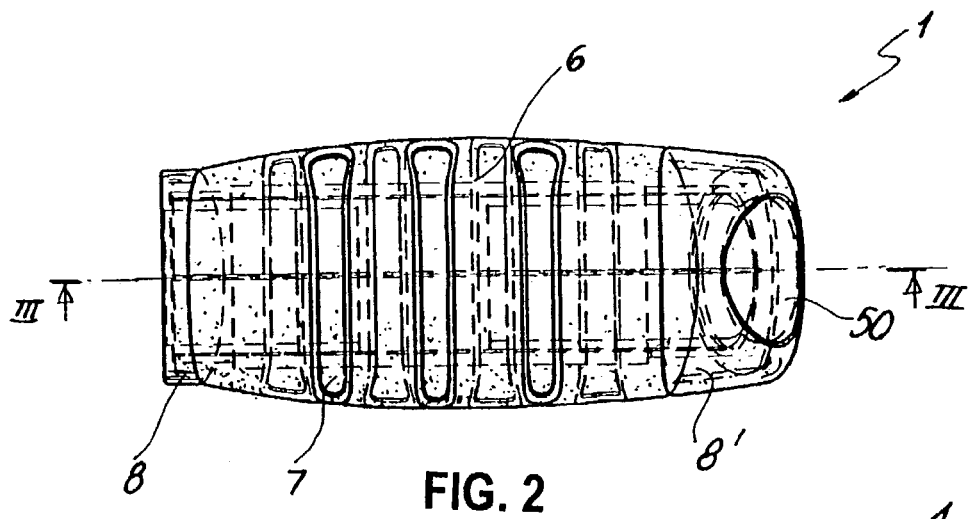
FIG. 2 shows schematically a top view of the grip according to FIG. 1.
Figure 3:
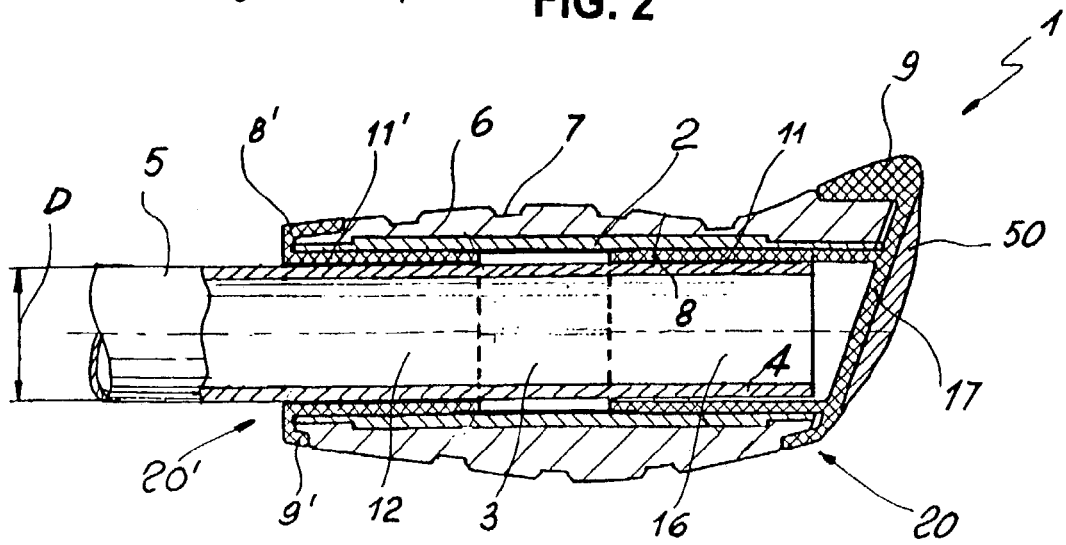
FIG. 3 shows a cross-sectional side view of the grip according to FIG. 1 along the line III-III of FIG. 2.
Figure 4:
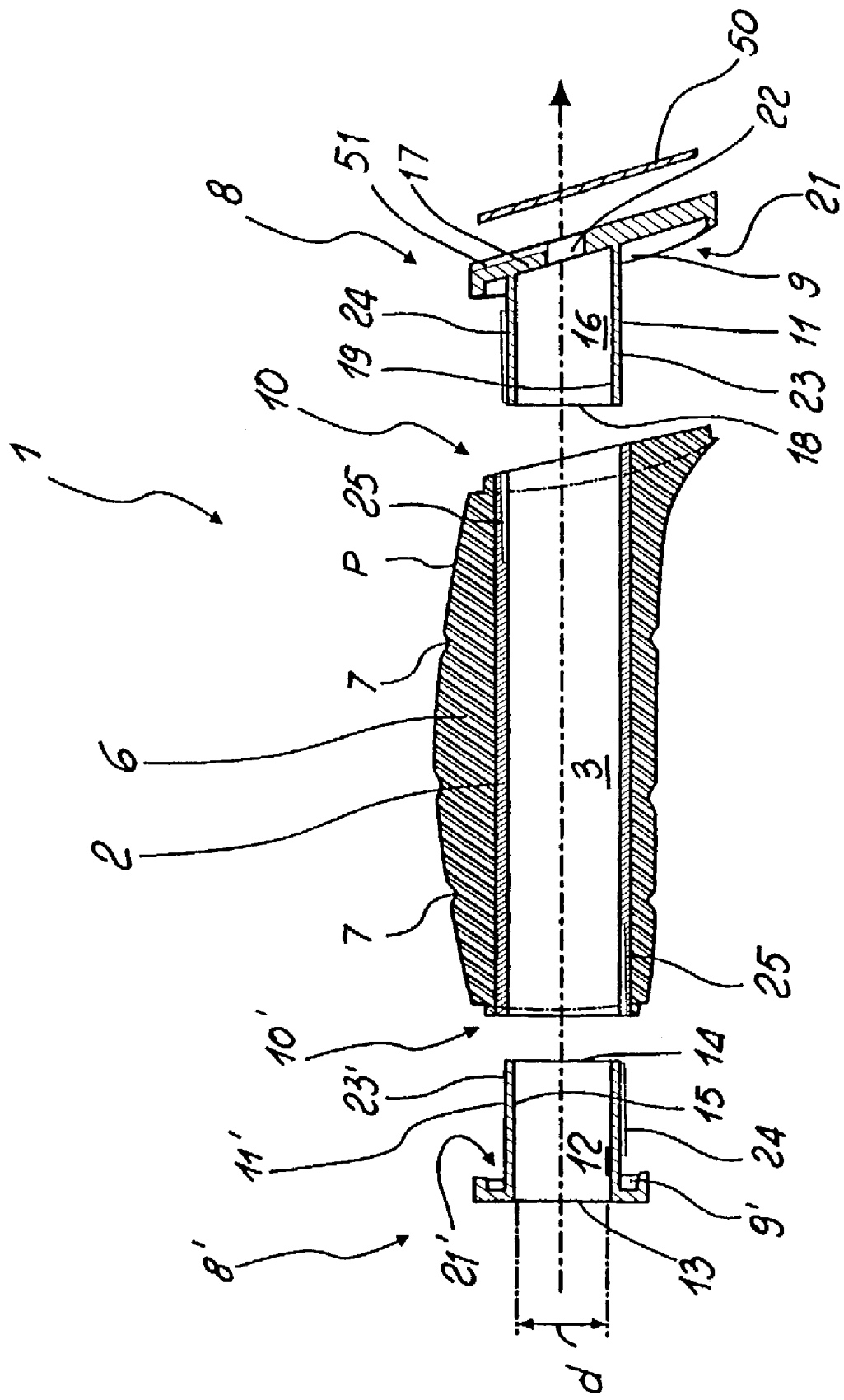
FIG. 4 shows an exploded side view, in lateral cross-section, of a further embodiment of a grip according to the invention.

With reference to the said drawings, the grip forming the subject of the present invention is labelled in its entirety 1.

Hereinafter, reference will always be made, for simplicity of explanation, to a grip for bicycles, it being understood that said grip may be used on all types of wheeled vehicles, such as scooters, mopeds, motorcycles, motorbikes or for other types of vehicles using grips.

According to the embodiment indicated in the attached drawings, the grip 1 is substantially formed by a main body 2 made of rigid or semi-rigid material and having a substantially tubular shape with a longitudinal axis A. Said axis defines internally thereof a cylindrical cavity 3 which, as will be better explained hereinafter, can receive the end section 4 of a handlebar 5.

A covering 6 of relatively soft material consisting, for example, of elastomeric material in gel form is arranged above the main body 2. The covering 6 has a profile P which is suitably shaped so as to allow an optimum grip by the cyclist and delimited at its ends by a first edge 10' and second edge 10. Advantageously, grooves 7 may also be envisaged so as to embrace hand ventilation.

According to the invention, the grip 1 also comprises terminal elements 8, 8' provided with annular protection rim 9, 9', which are intended to cover a corresponding end edge 10, 10' of the covering 6, and a tubular lug 11, 11', which extends coaxially inside the main body 2 between the end section 4 of the handlebar 5 and the main body 2.

In operation, the tubular lug 11 receives internally thereof the end section 4 of the handlebar 5, remaining compressed between said handlebar and the main body 2. In this situation, the tubular lug 11 deforms through compression and consequently engages with friction on the end section 4 and on the main body 2.

In other words, the tubular lug 11 is compressed against the substantially non-deformable, rigid, main body 2 by the end section 4 of the handlebar 5 which penetrates inside it and which is generally formed by a tubular shaped member made of metal and therefore also substantially rigid and non-deformable. Therefore, the problems of calibration which may derive from the requirement to design a slight interference able to allow mating between rigid and non-deformable materials such as the main body 2 and the handlebar 5 are completely overcome by the provision of a tubular lug 11 of elastically deformable material arranged between said elements 2 and 5. Moreover, for reasons of constructional simplicity and manufacturing efficiency, it is inadvisable to use specific engagement means or to machine the surfaces of the handlebar 5 and the grip 1 in order to achieve the mating. The grip 1 must, in fact, be able to fit onto the handlebar 5 simply by exerting a force of predetermined pressure, assigning the task of ensuring the stability of fixing performed to the frictional forces alone.

According to the present invention, the tubular lug 11 made of deformable material allows the engagement of the grip 1 on the handlebar 5 to be optimised within a wide tolerance range in the manufacture of the components.

For this purpose, the terminal element 8 is preferably made of a deformable elastomeric material having a hardness of between 50 and 80 Shore. The covering 6 is in turn advantageously formed by a soft material in gel form capable of ensuring high levels of shock absorbance of the vibrations transmitted from the ground to the cyclist.

It should also be noted that the annular protection rim 9 mainly has the object of preventing wear of the covering 6, which, as is known, being made preferably of soft material, would otherwise be subject to rapid deterioration.

Owing to said rim 9, it is, for example, possible to envisage resting the bicycle against a wall or other surface without damaging or ruining the grip 1.

According to the constructional example shown in the attached drawings, the grip 1 comprises two separate terminal elements 8, 8', of which a first element 8 is associated with the inner end 20 of the grip 1, and a second element 8' is associated with an outer end 20' of the grip 1. The tubular lug 11 of the first terminal element 8 is shaped so as to be able to fit on the end section 4 of the handlebar 5, while the tubular lug 11' of the second terminal element 8' is shaped so as to close the free end of the handlebar 5.

More precisely, the tubular lug 11' of the first terminal element 8 defines a through-cavity 12 which has openings 13 and 14 and is intended to grip on the end section 4 of the handlebar 5 by means of its inner surface 15.

The tubular lug 11 of the second terminal element 8', on the other hand, defines a closed cavity 16 which is delimited at one end by means of a closing portion 17 and is provided at the other end with an opening 18 able to allow the forced insertion of the handlebar 5 gripping on its inner surface 19.

Advantageously, a (transparent) plate 50 which displays, for example, an advertising logo, may be mounted on the outer surface 17' of the closing portion, preferably by means of bonding.

Said outer surface 17' is provided with grooves 51 which extend from said opening 18 to beyond the plate 50 so as to allow air to escape.

The internal diameter d of the tubular lugs 11, 11' of the terminal elements 8, 8' must have slightly smaller dimensions than the external diameter D of the handlebar 5 so as to ensure a good gripping action of the grip 1 on the handlebar 5 when said handlebar is force-fitted inside said lugs. Therefore, as observed above, the elastic deformability of the material which forms the tubular lugs 11, 11' allows operations to be carried out with tolerances which are fairly wide and such that they do not penalise the manufacturing process or fitting operations.

The first and second terminal elements 8', 8 are provided respectively with a first and a second annular seat 21', 21 which are capable of mating with the corresponding first and second end edges 10', 10 of the covering 6, said end edges being for this purpose suitably shaped so as to match the respective seats 21', 21.

Therefore, according to the preferred configuration shown in the attached drawings, the grip 1 is kept gripped on the end section 4 of the handlebar 5 coaxially with the main body 2 owing to the combined and balanced action exerted by the frictional forces produced by the two tubular lugs 11, 11' mounted on the ends of the grip 1.

Advantageously, in order to assist mounting of the grip 1 on the end section 4 of the handlebar 5, the closing portion 17 of the second terminal element 8 is provided with one or more holes 22 so as to allow escaping of air, which otherwise would be compressed inside the grip 1 during insertion of the latter on the handlebar 5.

Moreover, ribs 24 are arranged on the outer surfaces 23, 23' of the tubular lugs 11, 11' of each terminal element 8, 8', said ribs 24 being intended to be inserted in corresponding grooves 25 formed on the main body 2. The function of said ribs/grooves is on the one hand to prevent the rotation of the main body 2 and the covering 6 around the terminal elements 8, 8', and on the other to allow a perfect positioning of said terminal elements 8, 8' inside the main body 2. This also allows the annular seats 21, 21' to be mounted correctly on the corresponding edges 10, 10'.

It should be noted that the covering 6 is rigidly fixed on the outer surface of the main body 2 and this may be achieved by means of bonding or advantageously by mould-forming the covering 6 directly over the main body 2.

The invention thus conceived therefore achieves the predefined objects.

Obviously, said invention may also assume, in its practical embodiment, forms and configurations which differ from the embodiment described above, without thereby departing from the present scope of protection.

Moreover, all the details may be replaced by technically equivalent elements, and the dimensions, forms and materials used can be of any type according to requirements.

The invention claimed is:

1. A handlebar grip, comprising:
   a main body of substantially tubular shape with a longitudinal axis, defining a cylindrical cavity adapted to receive the end section of a handlebar, said end section having a substantially uniform external diameter;
   a covering of soft material which is fixed externally to said main body;
   at least one terminal element adapted to cover a corresponding end of said grip;
   said at least one terminal element having an elastically deformable tubular lug extending coaxially internally of said main body between the end section of said handlebar and the main body itself so as to firmly engage and exert a frictional force on both said main body and said handlebar;
   said tubular lug being a continuous annular wall of substantially constant or uniform cross section over a whole circular extent thereof and having an internal diameter that is slightly smaller than the external diameter of the handlebar end section such that, upon axial force-fitting of said terminal element onto the end section of said handlebar, said tubular lug elastically deforms to firmly grip said handlebar sufficiently to stationarily maintain the position of said tubular lug on said handlebar; and
   wherein said main body has an inner surface with a substantially constant diameter, said inner surface being radially spaced from and disposed out of engagement with the outer surface of the handlebar end section to provide a free tubular interspace between said handlebar and said main body.

2. Grip according to claim 1, further comprising at least one rib arranged on the tubular lug of said terminal element and at least one groove formed on the main body and shaped so as to receive said rib.

3. Grip according to claim 1, wherein said covering is formed by a material in gel form.

4. Grip according to claim 1, wherein said terminal element is made of a deformable elastomeric material having a hardness of between 50 and 80 shore.

5. Grip according to claim 1, wherein said covering of elastomeric material is molded on said main body.

6. Grip according to claim 1, wherein said terminal element is one of a first terminal element and a second terminal element and wherein said tubular lug is one of a first tubular lug and a second tubular lug, said first terminal element being associated with an outer end of said grip, said first tubular element having said first tubular lug shaped so as to close a free end of said end section of the handlebar, said second terminal element being separate from the first and associated with an inner end of said grip, said second terminal element having said second tubular lug shaped so as to fit over said end section of the handlebar.

7. Grip according to claim 6, wherein the tubular lug of said second terminal element defines a through-cavity in which the end section of said handlebar can be force-fitter with gripping engagement of an inner surface of the tubular lug of said second terminal element.

8. Grip according to claim 6, wherein said second terminal element is provided with a first annular protection rim mating with a first end edge of said covering, said first end edge being formed on the inner end of said grip and substantially shaped so as to match the protection rim.

9. Grip according to claim 2, wherein said first terminal element is provided with a first annular seat able to mate with an end edge of said covering, said end edge being formed on the outer end of said grip and substantially shaped so as to match a protection rim formed on said first terminal element.

10. Grip according to claim 6, wherein the grip is forced on the end section of said handlebar so as to exert frictional forces produced by elastic deformation of the tubular lugs.

11. Grip according to claim 6, wherein said first tubular lug and said second tubular lug keep said main body coaxially fixed on the end section of said handlebar.

12. Grip according to claim 6, wherein the tubular lug of said first terminal element defines a closed cavity delimited by a closing portion and by an opening in which the end section of said handlebar is force-fitted with gripping engagement between the outer surface of the handlebar and an inner surface of the tubular lug of said first terminal element.

13. Grip according to claim 12, wherein said closing portion is provided with at least one hole so as to evacuate air when said first terminal element is inserted on the end section of said handlebar.

* * * * *

UNITED STATES PATENT AND TRADEMARK OFFICE
CERTIFICATE OF CORRECTION

| | | |
|---|---|---|
| PATENT NO. | : 7,219,395 B2 | Page 1 of 1 |
| APPLICATION NO. | : 10/363416 | |
| DATED | : May 22, 2007 | |
| INVENTOR(S) | : Riccardo Bigolin | |

It is certified that error appears in the above-identified patent and that said Letters Patent is hereby corrected as shown below:

Col. 6,

Line 56: "2" should read --6--

Signed and Sealed this

Sixteenth Day of October, 2007

JON W. DUDAS
*Director of the United States Patent and Trademark Office*